US012571672B2

(12) United States Patent
Geffraye et al.

(10) Patent No.: US 12,571,672 B2
(45) Date of Patent: Mar. 10, 2026

(54) WEIGHING SYSTEM WITH CARPET PADS

(71) Applicant: Withings, Issy les Moulineaux (FR)

(72) Inventors: Victor Geffraye, Issy les Moulineaux (FR); Ianis Oueslati, Issy les Moulineaux (FR); Thomas Droze, Issy les Moulineaux (FR)

(73) Assignee: WITHINGS, Issy les Moulineaux (FR)

( * ) Notice: Subject to any disclaimer, the term of this patent is extended or adjusted under 35 U.S.C. 154(b) by 409 days.

(21) Appl. No.: 18/302,516

(22) Filed: Apr. 18, 2023

(65) Prior Publication Data

US 2024/0068862 A1    Feb. 29, 2024

(30) Foreign Application Priority Data

Aug. 30, 2022    (EP) ..................................... 22315196

(51) Int. Cl.
  *G01G 19/44*        (2006.01)
  *G01G 21/23*        (2006.01)
(52) U.S. Cl.
  CPC ............. *G01G 19/44* (2013.01); *G01G 21/23* (2013.01)
(58) Field of Classification Search
  CPC ............................... G01G 19/44; G01G 21/23
  See application file for complete search history.

(56) References Cited

U.S. PATENT DOCUMENTS 5,653,417 A * 8/1997 DeBarber ................ F16M 7/00
                                                        248/688
6,407,351 B1 * 6/2002 Meyer ...................... F16M 7/00
                                                        248/188.4

6,417,466 B2 * 7/2002 Gross ........................ G01G 3/12
                                                        73/862.632
9,151,659 B2 * 10/2015 Tsutaya .................... G01G 3/08
10,677,640 B2 * 6/2020 Dehner .................. G01G 21/28
11,262,231 B1 * 3/2022 Berme ................... G01G 21/23
D996,247 S * 8/2023 Barbedette ...................... D10/94
2006/0064030 A1 * 3/2006 Cosentino ............ A61B 5/4869
                                                        128/920
2014/0008133 A1 * 1/2014 Chan ........................ G01G 3/14
                                                        177/180
2014/0151135 A1 * 6/2014 Cosentino .............. G01G 19/44
                                                        177/210 R
2015/0308886 A1 * 10/2015 Shinozaki .............. G01G 23/06
                                                        177/180

(Continued)

FOREIGN PATENT DOCUMENTS

DE      20 2007 017499 U1    3/2008
EP          0 984 251 A2    3/2000
EP          2 711 109 A1    3/2014

OTHER PUBLICATIONS

Extended European Search Report as issued in European Patent Application No. 22315196.0, dated Jan. 17, 2023.

*Primary Examiner* — Natalie Huls
(74) *Attorney, Agent, or Firm* — Pillsbury Winthrop Shaw Pittman LLP

(57)            ABSTRACT

A weighing device configured to be placed on a floor and to measure at least the weight of a user or an object, the weighing device including a main body and at least one foot protruding out of the main body along a foot axis, the foot being configured to be on the floor, wherein the foot includes an open cavity. There is also provided a weighing system including a weighing device and a carped pad to be inserted in the open cavity.

18 Claims, 8 Drawing Sheets

(56)                    References Cited

U.S. PATENT DOCUMENTS

| | | | |
|---|---|---|---|
| 2016/0084430 A1* | 3/2016 | Kempf | G01G 23/002 |
| | | | 73/431 |
| 2016/0153826 A1* | 6/2016 | Oneid | G01G 21/22 |
| | | | 177/211 |
| 2017/0074719 A1* | 3/2017 | Izumo | G01G 21/28 |
| 2022/0333973 A1* | 10/2022 | Feldmann | G01G 21/28 |

* cited by examiner

130

510

500

200

300

E, A

120

Z

X

WEIGHING SYSTEM WITH CARPET PADS

CROSS REFERENCE TO RELATED APPLICATIONS

This application claims priority to European Patent Application No. 22315196.0, filed Aug. 30, 2022, the entire content of which is incorporated herein by reference in its entirety.

FIELD

The present invention relates to a weighing system device including a weighing device and carpet pads.

The weighing device is in particular a so-called "bathroom scale" or "personal scale". A bathroom scale may be used in a bathroom, but also in a bedroom or in another room of a house. Such a scale is commonly equipped with four feet, each of these feet being mechanically connected to a load cell. Such a configuration makes it possible to measure the weight of a user when he or she stands on the scale.

BACKGROUND

The weighing device is usually placed on a hard flat floor, for example on the tiling of a bathroom. However, the user may need to weigh himself on a carpet or a carpet floor, should he or she have carpet or a carpet floor in his or her bedroom or bathroom. To provide reliable measures on a carpet floor, it is known to arrange an additional piece on the bottom of each foot. This piece is larger than the foot and prevent the foot from sinking in the carpet. Moreover, these pieces enable to raise the scale off the floor.

As an example, the "Withings Body" scale and the "Withings Body+" scale are provided with a "carpet foot" to be fixed to each scale foot with an adhesive tape. As another example, the "Garmin Index" scale is provided with "carpet risers" surrounding the scale feet.

However, these solutions may not be entirely satisfying and may be further improved to provide a more accurate weight measurement on a carpet floor.

SUMMARY

An aspect of the disclosure is to provide a weighing device enabling a more accurate measure on every type of floor, notably on a hard floor or on a carpet floor, while being easy to use for the user. Another aspect of the disclosure is to provide a more versatile scale regardless of the floor. Yet another aspect of the disclosure is to provide a more robust, long-lasting solution, for measurement on a carpet floor.

To solve at least one of these issues, the disclosure relates to a weighing device configured to be placed on a floor and to measure at least the weight of a user or an object. The weighing device comprises a main body, and at least one foot protruding out of the main body along a foot axis, the foot being configured to be on the floor. The foot includes an open cavity. The open cavity is designed to receive a carpet pad to form a weighing system.

Thanks to the weighing system according to the disclosure, each foot may receive a carpet pad. In consequence, the user may weigh himself or herself on a hard floor without using the carpet pads or may weigh himself or herself on a carpet floor by easily inserting each carpet pad in the associated open cavity. The carpet pads prevent the feet from sinking in the carpet and enable to raise the weighing device off the floor. The carpet pads enable a better fixation on the feet. Indeed, the quality of fixation of an adhesive tape may decrease with time and an adhesive tape does not enable a multiple installation and removal of the carpet pads from the feet if the user often changes the floor on which he or she places the weighing system. The adhesive tape also prevents the use of anti-slippering rubber on the bottom of the feet. Moreover, by inserting the carpet pad inside the cavity, it enables a better fixation between the carpet pad and the associated foot by enabling the insert to exert a greater pressure along a greater contact distance on the foot relatively to a surrounding pad. In addition, the insert presents a smaller diameter than a surrounding fixation. As the tolerance margins increase with the diameter, the insert is more precisely produced and enables a more controlled fixation. Finally, the esthetic of the weighing system is improved when the carpet pads are assembled, which encourages the user to install the carpet pads on the feet when needed and to provide better weight measurements.

In an embodiment, each open cavity extends along the foot axis.

In an embodiment, each foot comprises two extremities along the foot axis among which a first extremity cooperating with the main body and a second extremity opposed to the first extremity, the second extremity being configured to contact the floor, wherein each foot includes an opening to access the open cavity, the opening being at the second extremity.

In an embodiment, an anti-slip cover is arranged along an edge of the opening of each foot, to avoid a slipping.

In an embodiment, the cavity has a depth along the foot axis that is greater than 3 mm. This ensures that the insert is sufficiently deep inside the foot to guarantee the stability and the robustness of the weighing device.

In an embodiment, each cavity presents a depth along the foot axis comprised between 5 mm and 15 mm, limits included and/or presents a width transversal to the foot axis comprised between 5 mm and 10 mm, limits includes.

In am embodiment, each cavity presents a truncated conic shape along the foot direction.

In an embodiment, the main body presents an upper plate on which a user may stand and the weighing device further comprises at least one load cell which is anti-slip cover mechanically placed between the upper plate and the foot, so that the weight of the user is transmitted to the feet via the load cells, thereby generating a weight measure.

In an embodiment, the main body presents an upper plate on which a user may stand, the upper plate extending in a transversal plane orthogonal to the foot axis.

In an embodiment, the main body presents an upper plate on which a user may stand and a bottom plate, the at least one foot protruding from the main body on the bottom plate side.

In an embodiment, the bottom plate comprises a bottom surface, the bottom surface presenting a convex shape.

The disclosure also relates to a weighing system comprising:

a weighing device as described above; and
  for each foot, a carpet pad configured to be inserted partially in the associated open cavity of the foot.

In an embodiment, the weighing device comprises four feet, the weighing system comprising a carpet pad associated to each foot.

In an embodiment, each carpet pad is configured to be removably inserted in the associated open cavity.

In an embodiment, each carpet pad is configured to be partially inserted in the associated open cavity by force fitting.

In an embodiment, the weighing system is able to switch from a hard floor configuration in which each carpet pad is away from the associated foot, each foot being able to be in contact with the floor and a carpet floor configuration in which each carpet pad is inserted partially in the associated open cavity and is able to be in contact with the floor.

In an embodiment, each carpet pad comprises:

a base extending along a main axis, which extends, when the carpet pad in mounted on the weighing device, in the extension of the associated foot, the base being configured to contact the foot of the weighing device;

an insert arranged radially inwards the base and configured to be at least partially inserted in the associated open cavity; and a baseplate extending transversally from the base, the baseplate presenting a contact surface able to be in contact with the floor (in particular the carpet).

In an embodiment, the base is configured to contact the foot of the weighing device to receive the load therefrom (i.e. the load along the foot axis). The insert inside the open cavity does not reach the bottom of the open cavity, so that the insert does not receive load from the foot.

In an embodiment, the base is configured to engage the second extremity of the foot.

In an embodiment, the insert comprises at least two leaves, for example four leaves, each leaf extending along the main axis and being able to be deformed while being inserted inside the associated open cavity. The deformation of the leaves allows the insert to be force fitted inside the open cavity.

In an embodiment, each leaf presents a curved free extremity.

In an embodiment, an anti-rotation element is arranged at the bottom of the open cavity of the foot, the anti-rotation element cooperating with the leaves when the carpet pad is inserted in the associated open cavity to prevent the rotation of the carpet pad inside the cavity along the main axis.

In an embodiment, the anti-rotation element is a protrusion.

In an embodiment, the base of the carpet pad defines a space to accommodate the anti-slip cover between the carpet pad and the foot, so that the anti-slip cover is not compressed when the associated carpet pad is inserted in the cavity.

In an embodiment, the contact surface comprises a convex rim extending out of the envelope.

In an embodiment, each carpet pad is inserted partially in the open cavity of the associated foot.

In an embodiment, each carpet pad is away from the open cavity of the associated foot (i.e., the carpet pad is not mounted on the weighing device)

In an embodiment, the weighing device comprising four feet, one carpet pad being associated to each foot.

An aspect of the invention also relates to a carpet pad configured to be engaged in an open cavity of a foot of weighing device, the carpet pad comprising:

a base extending along a main axis, the base being configured to engage an extremity of the foot;

an insert arranged radially inwards the base and configured to be inserted in the open cavity; and a baseplate extending transversally from the base, the baseplate presenting a contact surface able to be in contact with the floor.

In an embodiment, the insert comprises at least two leaves, for example four leaves, each leaf extending along the main axis and being able to be deformed while being inserted inside the open cavity.

BRIEF DESCRIPTION OF THE DRAWINGS

These features and benefits of the invention will appear more clearly upon reading the following description, provided solely as a non-limiting example, and done in reference to the appended drawings, in which.

DETAILED DESCRIPTION

In the following description, the terms "horizontal" and "vertical" are defined relatively to a weighing device placed on a flat floor F. When the weighing device is moved around by a user, the "vertical direction" as defined below may be different from the gravity direction. As illustrated on the Figures, a vertical axis Z, a longitudinal axis X and a transversal axis Y are defined. In normal use, the user stands along the vertical axis Z and the user's feet are positioned along the longitudinal axis Y of the weighing device.

Figure 1:
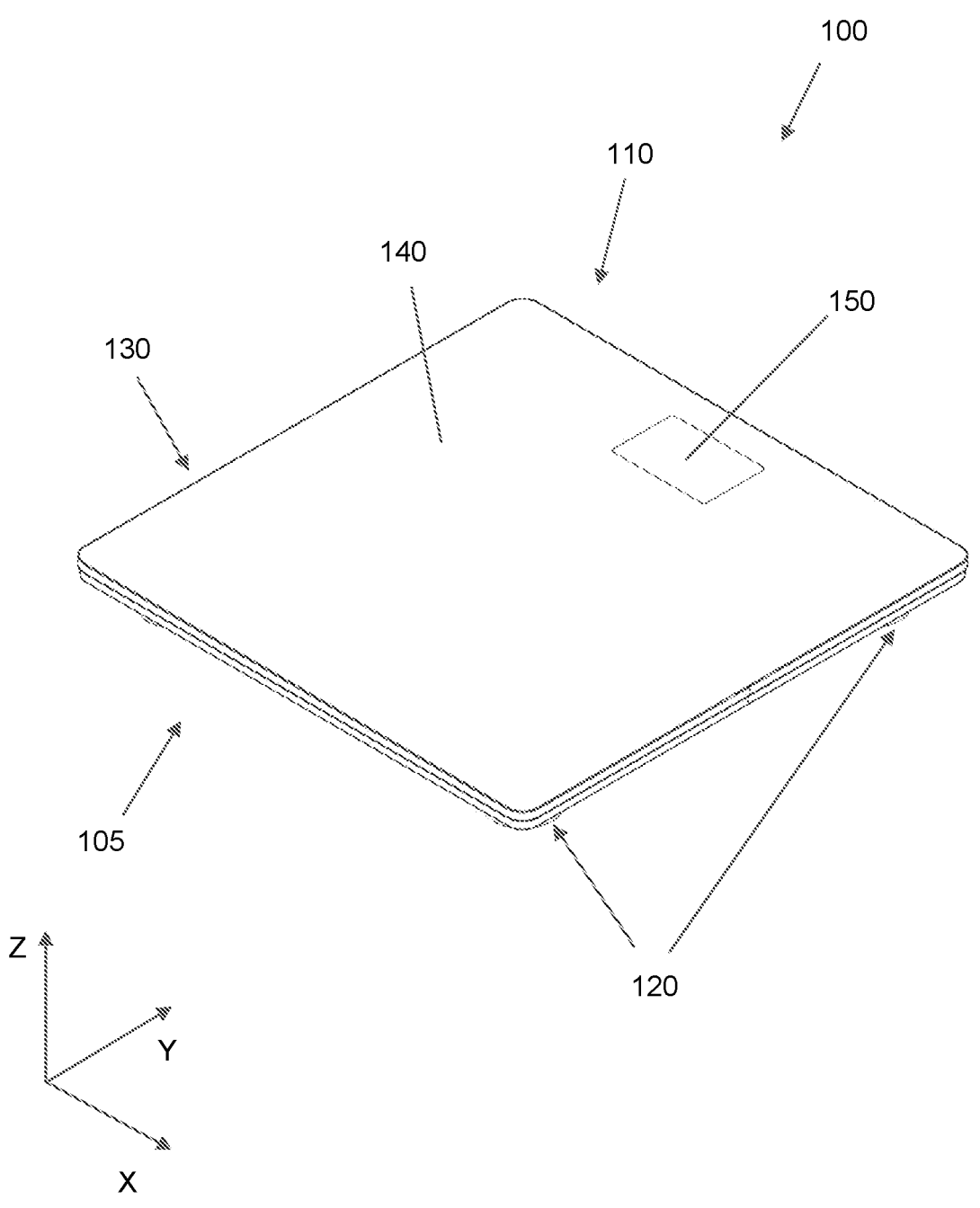
FIG. 1 shows a top perspective view along a foot axis of the weighing system according to the invention, the carpet pads being inserted in the feet.

A weighing system 100 is represented on FIG. 1. In the illustrated example, this weighing system 100 includes a weighing device 105, presented as an electronic bathroom scale, or personal scale, on which a user can position himself or herself to notably measure his or her weight and includes a plurality of carpet pads 120 configured to be mounted on the weighing device 105. In a beneficial embodiment, the weighing device 105 may also be configured to measure a body composition, an electrocardiogram (ECG), a Pulse Wave velocity, a ballistocardiogram (BCG), etc, and any combination of these parameters.

The weighing device 105 is configured to measure weights, for example in the range between 5 kg and 300 kg, limited includes, in particular within the range between 30 kg and 200 kg, limit included. Even such a device is known as "bathroom scale", it may be used in a bedroom or in another room of a house. As it will be seen below, the weighing device 100 may beneficially be used on a carpet or carpet floor, even a deep carpet floor.

The weighing device 105 comprises a main body 110 and at least one foot 300. In particular, the weighing device 105 comprises for example three or four feet, as illustrated on FIG. 3. The weighing system 100 comprises, for each foot 300, an associated carpet pad 120.

Figure 2:
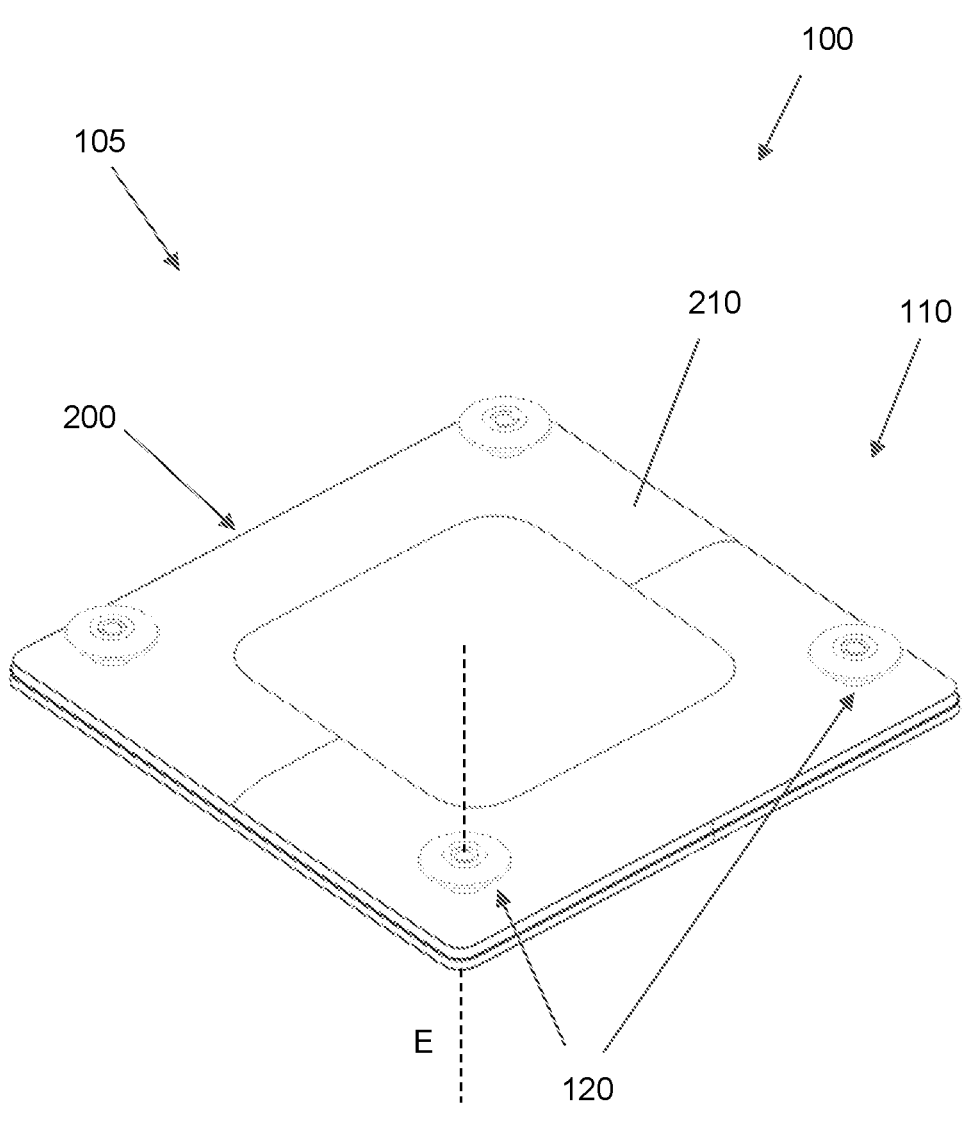
FIG. 2 shows the weighing device of FIG. 1 in a bottom perspective view along the foot axis.
Figure 2:
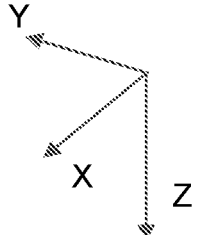
Figure 3:
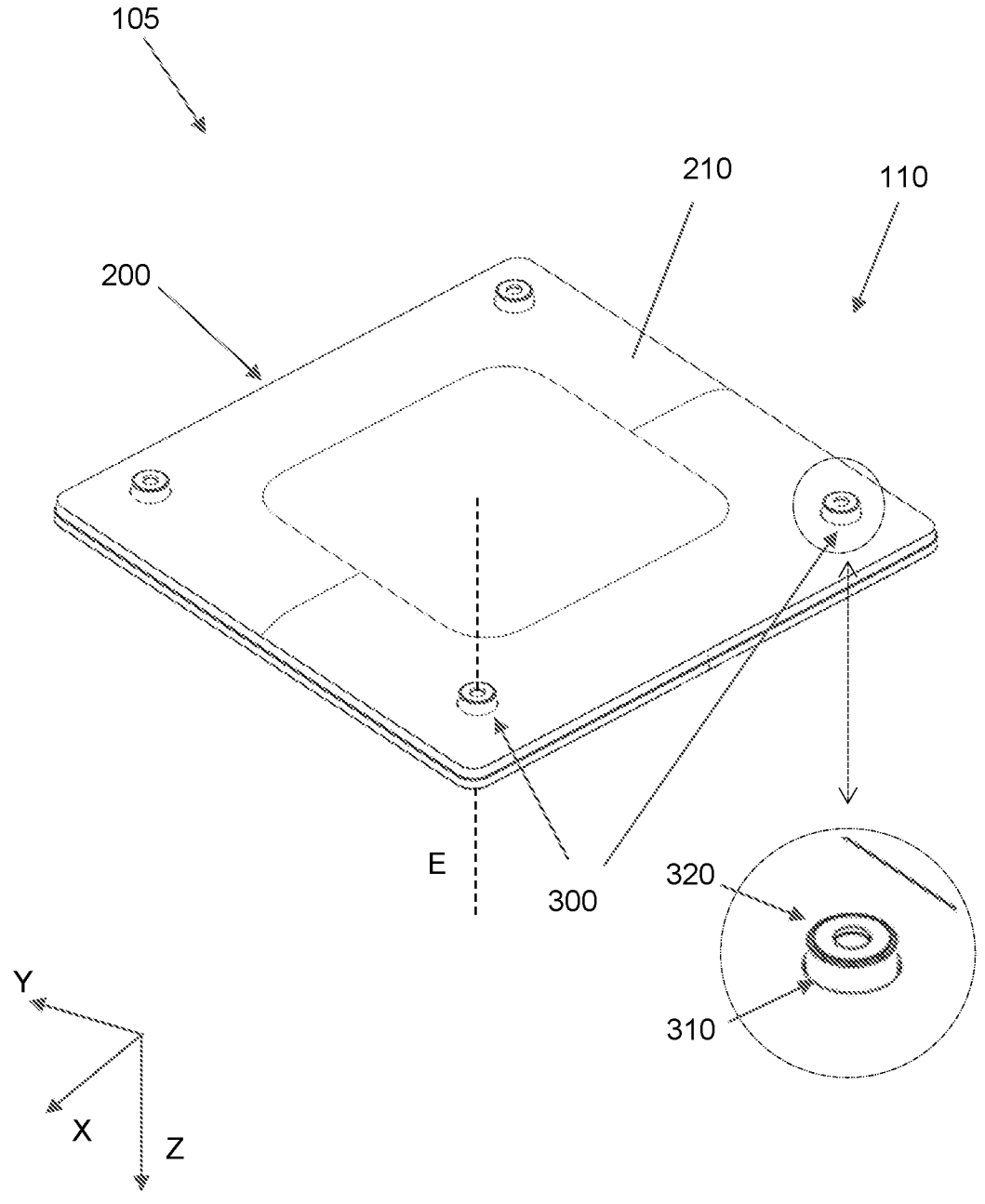
FIG. 3 shows a weighing device of the weighing system of FIG. 2 in the same bottom perspective view, the carpet pads being removed from the feet, with a zoom on one foot.

Referring to FIGS. 2 and 3, the weighing system 100 is able to switch from a hard floor configuration to a carpet floor configuration. Vice versa, the weighing system 100 is able to switch from a carpet floor configuration to a hard floor configuration.

In the hard floor configuration, illustrated on FIG. 3, each carpet pad 120 is away from the associated foot 300. By away, it is included "not being mounted on the associated foot" (and, therefore, the carpet pad 120 are not represented in FIG. 3). Each foot 300 is then able to be in direct contact with the floor F.

Figure 4:
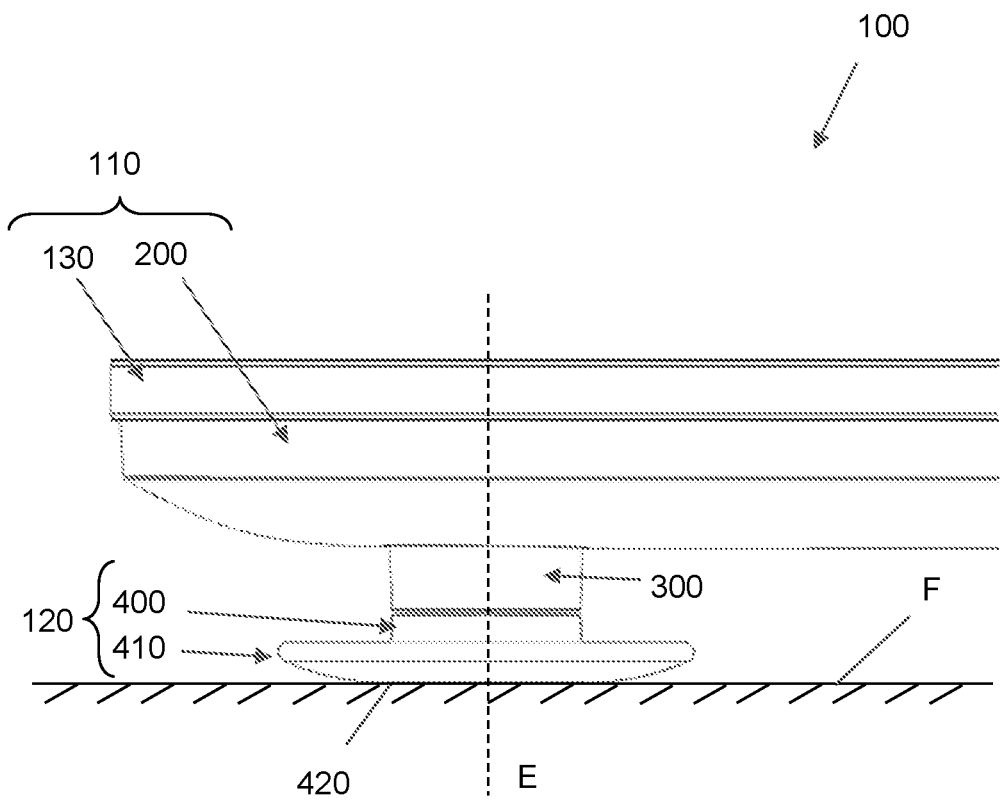
FIG. 4 shows a partial side view along a longitudinal axis of the weighing system of FIG. 1, the carpet pads being inserted in the feet.
Figure 4:
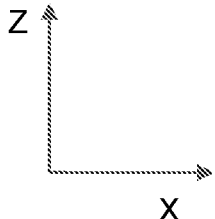

In the carpet floor configuration, illustrated on FIG. 2, each carpet pad 120 is mounted on the associated foot 300. As visible on FIG. 4, each carpet pad 120 is able to be in direct contact with the floor F. In the carpet floor configuration, the feet 300 do not directly touch the floor F.

It is nevertheless understood that the weighing system 100 may be used in the hard floor configuration on a carpet floor and, inversely, the weighing system 100 may be used in the carpet floor configuration on a hard floor, even if the weight measurements may be less accurate.

Referring again to FIGS. 1 and 2, the main body 110 comprises an upper plate 130 and a bottom plate 200. The main body 110 may include a display 150 (e.g., a screen or an LED or e-ink display) to display information to the user.

When the weighing device 105 is positioned flat on the floor F, the upper plate 130 extends in a transversal plane orthogonal to the foot axis E. This orthogonality allows for a vertical load distribution within the feet, hence a stronger resilience. The upper plate 130 comprises an upper surface 140. As illustrated, the upper surface 140 may be flat, so that a user may conveniently stand on the weighing system 100. Alternatively, the upper surface 140 may also be textured, so that it roughly resembles contours of human feet, and/or the upper surface 140 may be coated with a non-slippery material such as rubber or the like. The upper surface 140 may also include electrodes, for bioimpedance measurements. The material of the upper plate 130 may include any of: metal, plastic, glass, or other suitable material. The thickness along the foot axis E of the upper plate 130 may be comprised between 2 mm and 6 mm, limits included, for example between 4 mm and 6 mm, limits included.

Referring to FIG. 2, the bottom plate 200 is fixed to the upper plate 130. On the illustrated example, the bottom plate 200 is composed of several fixed parts. In a variant, the bottom plate 200 may be made on a single piece. The feet 300 are protruding from the main body 110 on the bottom plate side. The bottom plate 200 comprises a bottom surface 210. The thickness of the bottom plate 200 may be comprised between 2 mm and 6 mm, for example between 2 mm and 4 mm. As visible on FIGS. 2 and 3, the bottom surface 210 may present a convex shape to enable a better grip for a user moving the weighing system 100.

Generally, there is no restriction as for the shape of the upper plate 130 and the bottom plate 200. The two plates 130, 200 may be both of the same or similar shape, or in some embodiments they may also be of different shape, the shapes being for example one of a circle, a rectangle, a hexagon or even an asymmetrical or irregular shape such as rhombic shape or similar. The upper plate 130 and the bottom plate 200 may have the same shape, but one of them may be larger than the other. In an exemplary embodiment displayed on FIGS. 1 to 3, both the upper plate 130 and the bottom plate 200 have a square shape with rounded corners, where both squares are having sides of the same size. In this embodiment, the upper plate 130 is positioned such that when viewed from the top, it overlaps the bottom plate 200.

The thickness of the upper plate 130 and the bottom plate 200, and the distance between them, are chosen such that the overall thickness of the weighing device 105 along the foot direction Z does not exceed 25 mm. In some embodiments, the thickness of the weighing device 105 may be beneficially reduced to less than 20 mm, and in an embodiment less than 18 mm.

Figure 5:
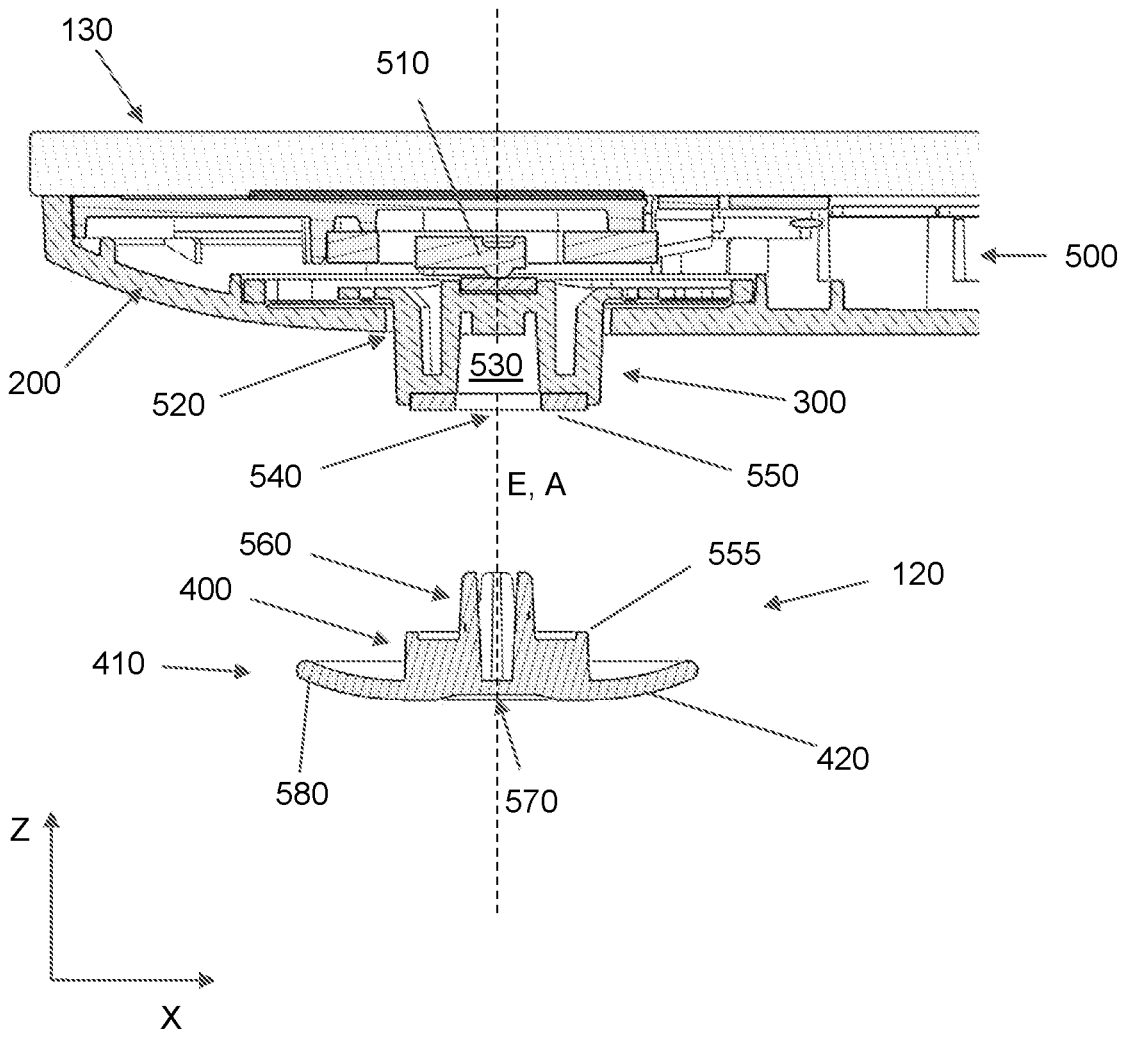
FIG. 5 shows a cross-sectional view of the weighing system of FIG. 4, the carpet pads being away from the feet.
Figure 6:
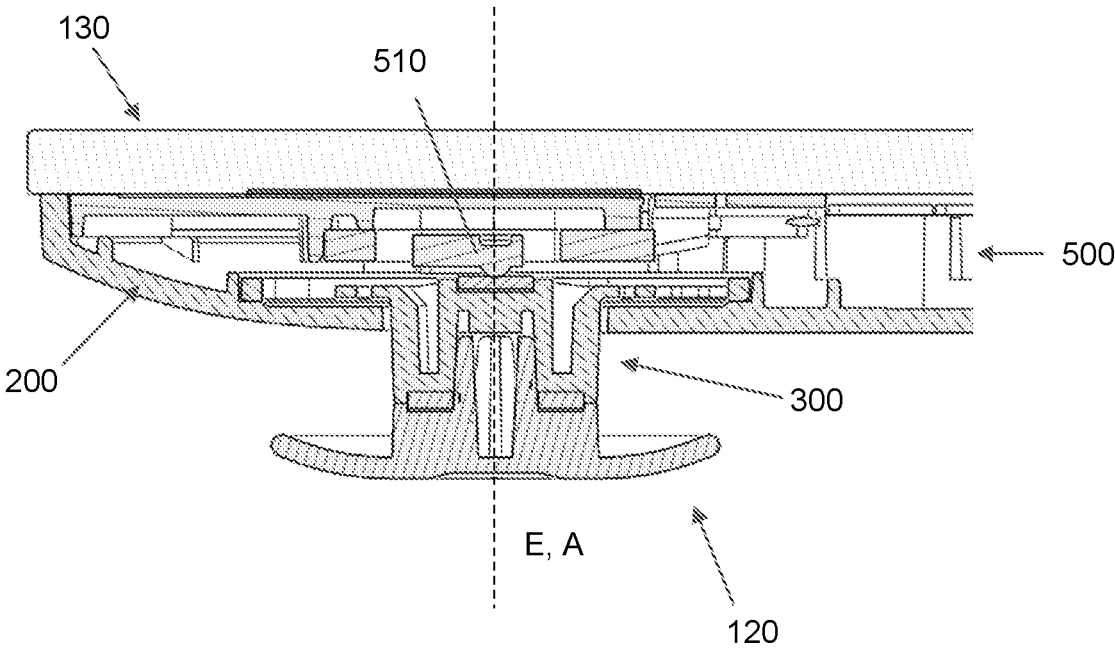
FIG. 6 shows a cross-sectional view of the weighing system of FIG. 4, the carpet pads being fixed to the feet.
Figure 6:
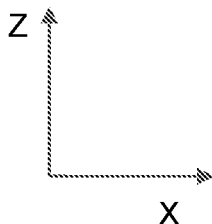
Figure 7:
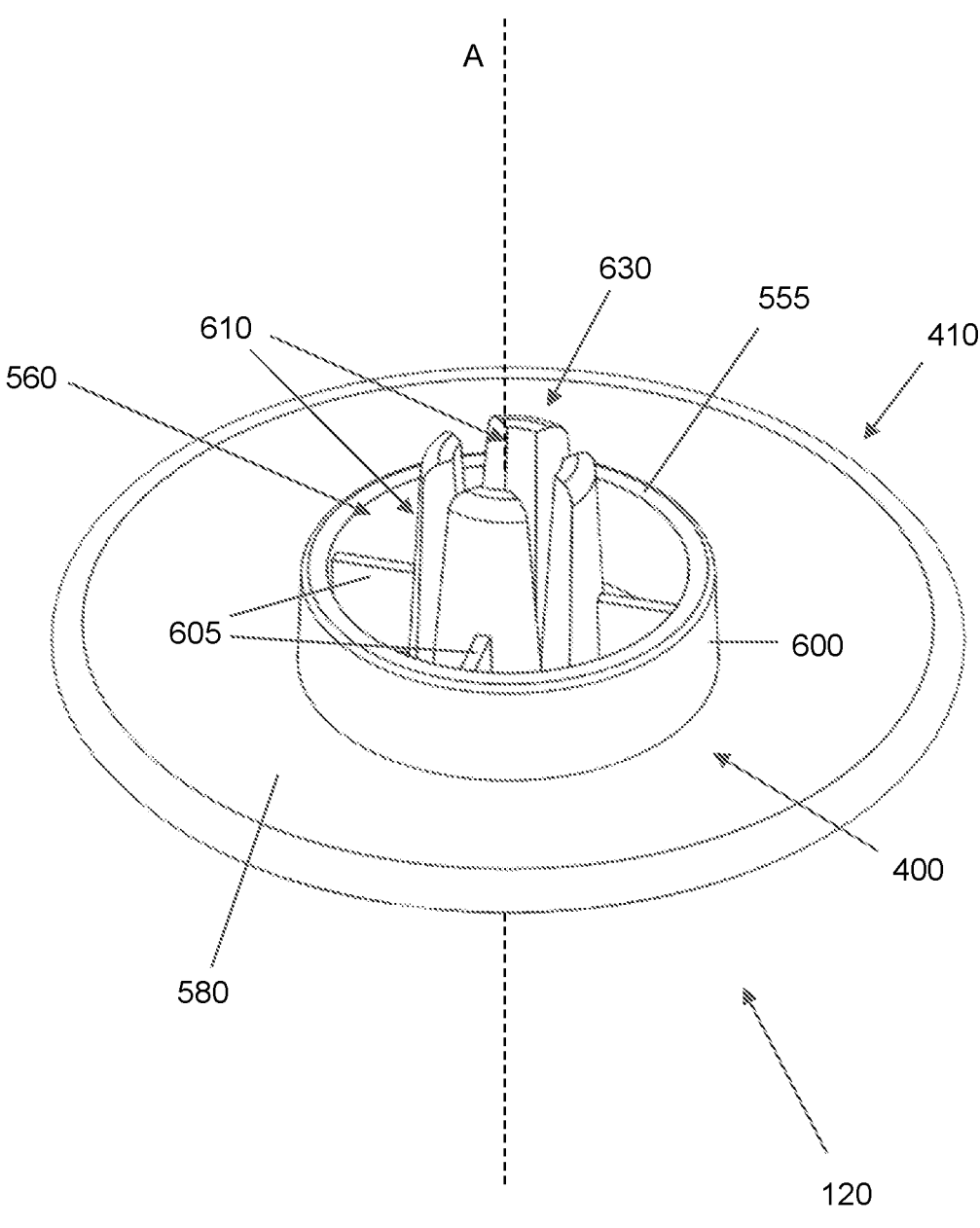
FIG. 7 shows a perspective view of a carpet pad according to the invention.

As visible on FIGS. 5 and 6, the upper plate 130 and the bottom plate 200 form a housing, the housing defining an internal volume 500.

The weighing device 105 further comprises a control circuitry arranged inside the internal volume 500 with a processor and memory, and an input/output (I/O) interface, which, among other things, allows the control circuitry to receive and send data to a communication network. The processor is configured to, among other things, process data obtained by weight sensors arranged inside the internal volume 500. The control circuitry and other electronic components may be mounted on a printed circuit board (PCB), which is attached to the bottom plate 200, for example.

The weighing device 105 further comprises a battery (e.g., a rechargeable battery) arranged inside the internal volume 500 configured for supplying power to the various components of the weighing device 105.

The weighing device 105, and in particular the input/output (I/O) interface, may communicate with third party devices via a communication network, which is for example a wireless network (in particular a network compatible with at least one of the following communication protocols: Bluetooth, Wi-Fi, cellular, etc.). The third-party devices may include a server and a mobile terminal (smartphone, etc.). The weighing device 105 may communicate with the server and/or the mobile terminal. In ae embodiment, the weighing device 105 may communicate directly with the mobile terminal, for example via Bluetooth or Bluetooth Low Emission (BLE). This communication may be implemented at the installation of the weighing device 100, in particular to pair it with the mobile terminal and/or to configure a connection to the server that does not transit through the mobile terminal and/or as a backup for a failed communication with the server. In an embodiment, the weighing device 105 may communicate directly with the server, without transiting through the mobile terminal. This communication allows the user to use the weighing system 100 even without having the mobile terminal nearby.

As visible on FIG. 3, the four feet 300 protrude out of the main body 110 from the bottom plate 200 side, along the foot axis E. In the illustrated embodiment, the four feet 300 are respectively arranged near the four corners of the square bottom plate 200. Alternatively, if the bottom plate 200 presents a round or oval shape, the four feet 300 may be distributed around the center axis of the weighing device 105.

The weighing device 105 comprises weight sensors. In particular, each foot 300 is associated to a weight sensor. As visible on FIGS. 5 and 6, each weight sensor is notably a load cell 510 associated to each foot 300 and arranged inside the internal volume 500. The load cell 510 is mechanically placed between the upper plate 130 and the foot 300, so that the weight of the user is transmitted to the feet via the load cells, thereby generating a weight measure. In a known way, each load cell 510 comprises a deformable portion, the deformation of which being linked to the strain applied thereto, that is to say the weight the user. In an embodiment, each a load cell may include two strain gauges, in particular a first element whose resistance increases under the effect of vertical compression applied to the foot in question and a second element whose resistance decreases under the effect of said vertical compression.

Each foot 300 may present a height along the foot axis E comprised between 2 mm and 15 mm, limits included. Each foot 300 may present a width transversal to the foot axis E comprised between 10 mm and 30 mm, limits included, notably comprised between 15 mm and 25 mm, limits included.

As visible on FIGS. 5 and 6, each foot 300 crosses an associated opening 520 defined in the bottom plate 200. Each foot 300 is free to move relatively to the bottom plate 200 and cooperates with the associated load cell 510 to transmit the load variations exerted on the upper plate 130 by the user when he/she stands on it. Each foot 300 is able to pivot relatively to the main body 110. The opening 520 and the associated foot 300 are arranged in such a way that the foot 300 does not touch the bottom plate 200 when a user is standing on the weighing system 100, even if the user is slightly moving, as a contact between the foot 300 and the bottom plate 200 would impact the weight measure.

Each foot 300 comprises two extremities along the foot axis E, among which a first extremity 310 cooperating with the main body 110 and a second extremity 320 opposed to the first extremity, configured to contact the floor F.

Referring to FIGS. 5 and 6, each foot 300 includes a cavity 530 (only one cavity per foot in an embodiment). The cavity 530 is in particular an open cavity 530. By "open cavity", it is understood that the cavity is accessible from the outside of the main body 110 when a carpet pad is not inserted in the cavity. To that end, each foot 300 includes an opening 540 to access the open cavity 530 from the outside of the main body 110. The open cavity extends along the foot axis E. In that regard, the opening 540 is arranged on the second extremity 320 of the foot 300, that is to say the extremity where the foot contacts the floor F. When the weighing device 105 is properly installed on the floor, the opening 540 is therefore invisible to the user. The opening 540 is defined at the opposite of the bottom plate 200 along the foot axis E. Each opening 540 is for example circular.

To homogenize the load in the foot, the open cavity may be centered in the foot around the foot axis E.

The radius of the open cavity 530, in a transversal direction to the foot axis E, at the second extremity 312, may be comprised between 20% and 60% of the radius of the foot 300, limits included, even comprised between 30% and 50%, limits included.

Each cavity 530 may present a truncated conic shape along the foot axis E. The truncated shape expands its diameter when moving away from the bottom plate 200 towards the opening 540. In particular, each cavity 530 may present a depth along the foot axis E comprised between 5 mm and 15 mm. Each cavity 530 may present a width transversal to the foot axis E comprised between 5 mm and 10 mm, limits included. The difference of width between the minimal width and the maximal width of the cavity 530 may be greater than 1 mm, notably greater than 2 mm.

Each foot 300 may further comprises an anti-slip cover 550 arranged on the second extremity 312 of the foot 300 (that in contact with the floor F in the hard flat configuration). In particular, the anti-slip cover is a ring. As visible on FIG. 5, the anti-slip cover 550 may be arranged along an edge of the opening 540. When the opening 540 is circular, the anti-slip cover 550 may also be circular. The anti-slip 550 is for example made of rubber or of elastomer. In the hard floor configuration, the anti-slip cover 550 is designed to be in contact with the floor F and prevents the weighing device

100 from slipping. In an embodiment, as it will be explained below, in the carpet floor configuration, the anti-slip cover 550 is not compressed by the associated carpet pad 120.

Referring to FIGS. 4 to 7, each carpet pad 120 comprises a base 400, an insert 560 and a baseplate 410. The base 400 may include a body 600 and at least one buttress 605. The base 400, in particular the body 600, is configured to receive the load of the main body 110 of the weighing device 100 via the foot 300 and to distribute it to the baseplate 410 which is configured to contact the floor. The insert 560 is configured to engage the open cavity 530 so that the carpet pad 120 remains attached to the foot 300. The carpet pad 120 extends along a main axis A. When inserted in the open cavity 530, the main axis A and the foot axis E are parallel, and even confounded.

The use of a carpet pad 120 with an insert 560 going inside an open cavity 530 of a foot 300 increases the robustness of the carpet pad 120, as the transversal load exerted on the insert 560 is lower and oriented radially inwards around the main axis A. By reducing the transversal load on the insert 560, which is the part of the carpet pad 120 that attaches the later to the weighing device 105, the durability and the versatility of the weighing system 100 are increased. The open cavity 530 also allows for a longer insert 560 along the main axis A, thereby improving the stability of the weighing assembly 100 when a user steps on it. The insert 560 enables also a more distributed effort on a greater surface of the foot 300. Therefore, the constraints on the insert 560 are reduced compared to a pad arranged around the foot 300. As a consequence, the carpet pad 120 is assembled more easily with the foot 300.

Moreover, the insert 560 enables not to increase the external diameter of the foot 300 and so does not reduce the mechanical play between the foot 300 and the bottom plate 200. Therefore, the addition of the carpet pads 120 on the feet 300 does not impact the accuracy of the weight measurement. A scale with a surrounding pad would need higher feet or a pad with a smaller height which would lead to a less efficient fixation.

In addition, the insert 560 enables a more guided and intuitive fixation of the carpet pad 120 with the foot 300. The insert 560 is guided into the cavity 530 and the user has only to push the carpet pad 120 into the cavity 530.

The body 600 is designed to be in contact with the foot 300 (more precisely the second extremity 320 of the foot 300) to transfer the load along the foot axis E. In that regard, the part of the insert 560 that is configured inside the open cavity is shorter along the main axis A than the depth of the open cavity 530 along the foot axis E. Therefore, the vertical loads are uniquely transmitted through the body 600 as the insert 560 does not touch the bottom of the cavity 530. This enable a unique contact between the carpet pad 120 and the foot 300 and prevents a double stop configuration which is problematic due to the tolerance margins.

In particular, as regards the transmission of load, the body 600 is not configured to be in contact with the anti-slip cover 550. The anti-slip cover 550 is not compressed by the body 600 when the carpet pad 120 is inserted in the cavity 530, on the carpet floor configuration. To that end, the body 600 may comprise a rim 555 which extends along a periphery of the base 400. The rim 555 and the insert 560 define therebetween a space (e.g., an annular shaped space around the insert), on top of the buttress 605, configured to receive the anti-slip cover 550 of the foot 300. The space is larger along the main axis A than the thickness of the anti-slip cover 550.

The body 600 may be cylindrical and extends along a main axis A. When the carpet pad 120 is inserted in the associated open cavity 530, the main axis A is parallel to the foot axis E. When the carpet pad 120 is inserted in the associated open cavity 530, the base 400 is flushed with the associated foot 300. In other words, there is no discontinuity between the external surface of the base 400 and the external surface of the foot 300 at the contact level. In other words, where the base 400 and the foot 300 meet, the base 400 presents an external diameter sensibly equal to the external diameter of the associated foot 300. By "sensibly," it is meant that there is a deviation of less than 5% between the external diameters. In particular, the envelope 400 presents an external diameter transversally to the main axis A comprised between 5 mm and 30 mm, limits included, notably comprised between 15 mm and 25 mm, limits included. Therefore, when assembled, the carpet pad 120 seems to be naturally part of the weighing system 100.

The insert 560 is arranged radially inwards the base 400. In other words, the insert 560 is arranged closer to the center, in a transversal plane to the main axis A, of the carpet pad 120 than the base 400. The insert 560 is configured to be partially inserted in the open cavity 530 of the associated foot 300, via the opening 540. The insertion may be a force fitted insertion or a threaded insertion.

To that end, the insert 560 comprises at least two leaves 610, for example three or four leaves 610. A "leaf" may also be called a "leg". As visible on FIG. 7, the four leaves 610 are distributed around the main axis A. The leaves 610 are configured to be inserted in the open cavity 530.

For example, the four leaves 610 comprise two couples of leaves 610 facing each other on each side of the main axis A. Each leaf 610 presents a circular arc shape in a transversal plane to the main axis A, to facilitate the insertion of the insert 560 inside the open cavity 530. Each leaf 610 extends along the main direction A. In particular, each leaf 610 may protrude from the baseplate 410 along the main direction A. The leaves 610 may be sensibly parallels to one another. By "sensibly," it is meant that there is an angular deviation of less than 5% between the longitudinal directions of the leaves (i.e. the longitudinal directions of the leaves are parallel to each other). Each leaf 610 may extend on a length comprised between 3 mm and 15 mm, limits included, along the main axis A, notably between 5 mm and 10 mm, limits included. In particular, each leaf 610 presents a length so that, when the insert 560 is inserted in the cavity 530, the free extremity 630 of the leaf 610 do not come into contact with the bottom of the cavity 530. Each leaf 610 is able to be deformed when being inserted inside the associated open cavity 530. In particular, the free extremity 630 of the leaf 610 is configured to be displaced radially inwards, that is to say transversally to the main axis A, towards the center of the carpet pad 120 in a transversal plane to the main axis A. When inserted in the cavity 530, the leaves 610 exert a radial pressure on the open cavity side walls so that the carpet pad 120 remained fixed to the associated foot 300. This allows a force fitting insertion, but also allows removing the carped pad by pulling it from the open cavity (e.g., by pulling the baseplate 410).

The buttress 605 is arranged radially (i.e., radially around the main axis A) between the insert 560 and the body 600. In the example of the FIG. 7, the buttress 605 may be a panel extending radially between the insert 560 and the envelope 405. There may be one buttress 605 per leaf 610. In a variant, the buttress 605 may be a single piece arranged circumferentially between the insert 560 and the envelope body 600. The buttress 605 reinforces the insert 560, especially since the leaves are forced fitted inwards, thereby creating a lever effect for the portion of the insert 560 which remain outside the open cavity.

Figure 8:
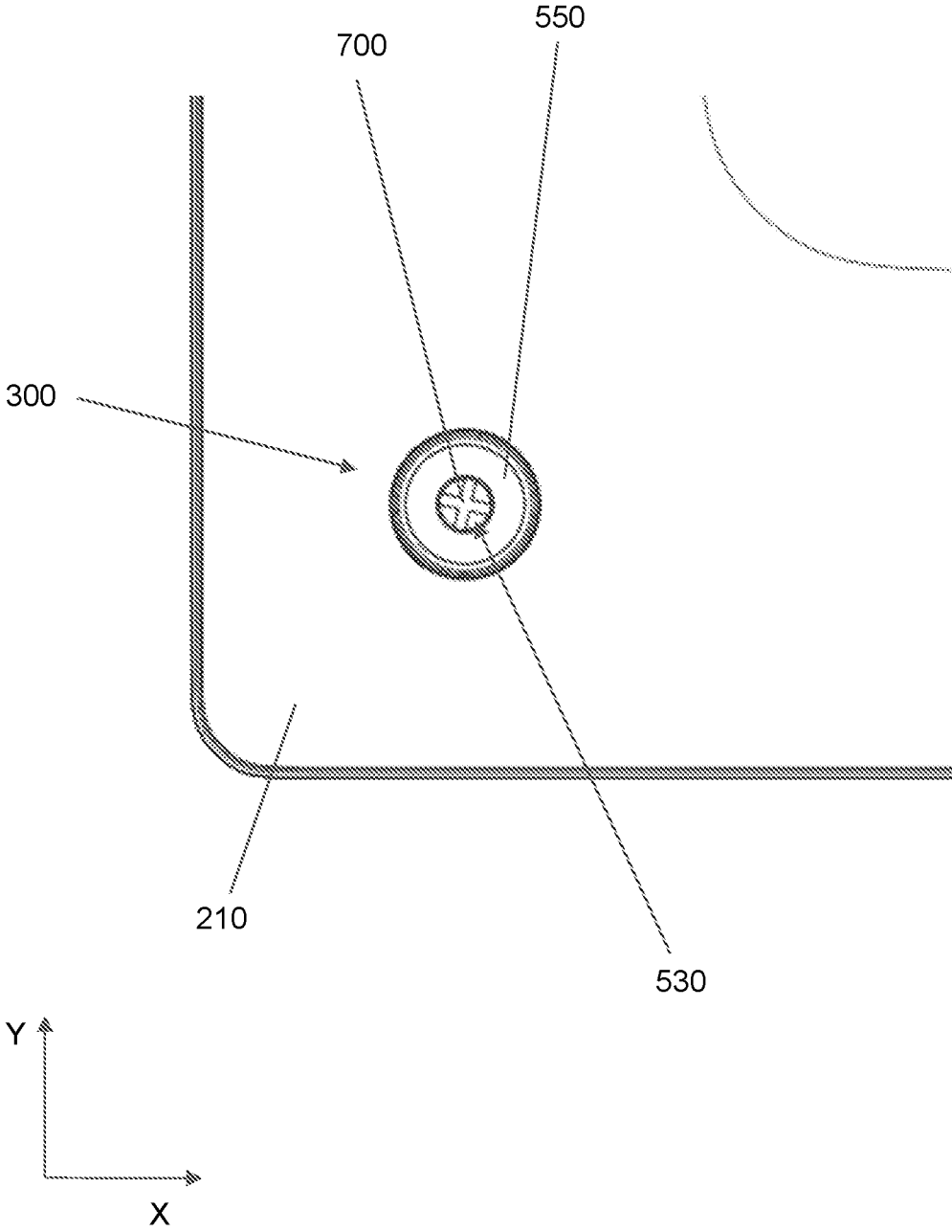
FIG. 8 shows a bottom view of the weighing device of FIG. 3, the carpet pads being removed from the feet.

Referring to FIG. 8, in an embodiment, an anti-rotation element 700 may be arranged on the bottom of the cavity 530. The anti-rotation element 700 may be a protrusion (e.g., a cross shape protrusion) protruding along the foot axis E inside the cavity 530. As it will be further explained below, the anti-rotation element 700 prevents the carpet pad 120 to rotate inside the cavity 530 when inserted in it.

When inserted in the cavity 530, the leaves 610 may cooperate with the anti-rotation element 700, visible on FIG. 8. In particular, the anti-rotation element 700 may cooperate with the free extremity 630 of the leaves. In particular, the anti-rotation element 700 may be inserted between the leaves 610 and may prevent the rotation of the carpet pad 120 inside the cavity 530 along the main axis A. The interface between the leaves 610 and the protrusion is entirely radial, so that no load along the main axis A is transmitted.

The carpet pad 120 is configured to be removably inserted in the associated open cavity 530. In other words, the exerted pressure is so that the carpet pad 120 may be easily removed by a user from the cavity 530 by pulling the carpet pad 120. Contrary to an adhesive fixation, the carpet pad 120 is not deteriorated by its removal and may be again inserted in the cavity 530. In a similar manner, the foot 300 is not deteriorated by the insertion of the carpet pad 120.

Each leaf 610 presents a curved free extremity 630 to enable a smooth insertion of the insert 560 in the associated open cavity 530. In particular, the free extremity 630 comprises a radially external rounded edge.

In an alternative embodiment (not illustrated), the insert 630 includes on its outer surface a threading configured to cooperate with a threading inside a wall of the open cavity 530 of the foot 300. The carpet pad 120 may thus be threaded inside the foot 300. The threading may be slightly loose to avoid the transmission of vertical load. Once tightened, the carped 120 does not rotate when the weighing system 100 is normally used.

The baseplate 410 of the carpet pad 120 extends transversally to the base 400. In particular, the baseplate 410 extends transversally to the main axis A. The baseplate 410 may present a generally circular shape so that visually the angular position of the carped pad 120 in the open cavity does not matter. The baseplate 410 presents a diameter transversally to the main axis A comprised between 15 and 40 mm, limits included. The baseplate 410 comprises a contact surface 420 able to be in contact with the floor F, as represented on FIG. 4.

The contact surface 420 comprises a concave recess 570 arranged in the extension of the base 400 along the main axis A. In particular, the concave recess 570 is arranged at the center of the baseplate 410. The recess 570 may present a height comprised between 0.5 mm and 3 mm along the main axis A. The recess 570 presents a diameter comprised between 5 mm and 15 mm, limits included, transversally to the main axis A. The recess 570 enables a better contact and a better load transmission between the carpet pad 120 and the floor F, while enabling to using less material for the carpet pad.

The contact surface 420 comprises a convex rim 580 extending out of the envelope 400. The rim 580 extends circumferentially around the base 400. The height difference between the edge of the rim 580 and the base of the rim 580 connected to the base 400 may be comprised between 1 mm and 5 mm, limits included. The convex rim 580 prevents the carpet pad 120 to get stuck into the carpet floor when the user is moving the weighing system 100 along the floor F.

The carpet pad 120 may be made integral, for example in plastic. In that regard, the carped pad 120 may be designed with only draft angles so that it can be easily molded, for quicker and cheaper manufacturing processes.

The articles "a" and "an" may be employed in connection with various elements and components of structures described herein. This is merely for convenience and to give a general sense of the structures. Such a description includes "one or at least one" of the elements or components. Moreover, as used herein, the singular articles also include a description of a plurality of elements or components, unless it is apparent from a specific context that the plural is excluded.

It will be appreciated that the various embodiments described previously are combinable according to any technically permissible combinations.

The invention claimed is:

1. A weighing system comprising:
a weighing device configured to be placed on a floor and to measure at least the weight of a user or an object, the weighing device comprising:
a main body,
at least one foot protruding out of the main body along a foot axis, the foot being configured to be on the floor, wherein the foot includes an open cavity, and
for each foot, a carpet pad configured to be inserted partially in the associated open cavity of the foot,
wherein the foot includes only one open cavity designed to receive the associated carpet pad.

2. The weighing system according to claim 1, wherein each open cavity is centered in the foot around the foot axis.

3. The weighing system according to claim 1, wherein each open cavity extends along the foot axis.

4. The weighing system according to claim 1, wherein each foot comprises two extremities along the foot axis among which a first extremity cooperating with the main body and a second extremity opposed to the first extremity, the second extremity being configured to contact the floor, wherein each foot includes an opening to access the open cavity, the opening being at the second extremity.

5. The weighing system according to claim 4, wherein an anti-slip cover is arranged along an edge of the opening of each foot.

6. The weighing system according to claim 4, wherein each opening is circular.

7. The weighing system according to claim 4, wherein a radius of the open cavity, in a transversal direction to the foot axis, at the second extremity, is comprised between 20% and 60% of a radius of the foot.

8. The weighing system according to claim 4, wherein a radius of the open cavity, in a transversal direction to the foot axis, at the second extremity, is comprised between 30% and 50% of a radius of the foot.

9. The weighing system according to claim 1, wherein each cavity presents a depth along the foot axis comprised between 5 mm and 15 mm.

10. The weighing system according to claim 1, wherein each cavity presents a truncated conic shape along the foot direction.

11. The weighing system according to claim 1, wherein each carpet pad is configured to be removably inserted in the associated open cavity.

12. The weighing system according to claim 1, wherein each carpet pad comprises:
a base extending along a main axis and configured to engage an extremity of the foot,
an insert arranged radially inwards the base and configured to be at least partially inserted in the associated open cavity, and
a baseplate extending transversally from the base, the baseplate presenting a contact surface able to be in contact with the floor.

13. A weighing system comprising:
a weighing device configured to be placed on a floor and to measure at least the weight of a user or an object, the weighing device comprising:
a main body,
at least one foot protruding out of the main body along a foot axis, the foot being configured to be on the floor, wherein the foot includes an open cavity, and
for each foot, a carpet pad configured to be inserted partially in the associated open cavity of the foot,
wherein each cavity presents a width transversal to the foot axis comprised between 5 mm and 10 mm.

14. A weighing system comprising:
a weighing device configured to be placed on a floor and to measure at least the weight of a user or an object, the weighing device comprising:
a main body,
at least one foot protruding out of the main body along a foot axis, the foot being configured to be on the floor, wherein the foot includes an open cavity, and
for each foot, a carpet pad configured to be inserted partially in the associated open cavity of the foot,
wherein each carpet pad comprises:
a base extending along a main axis and configured to engage an extremity of the foot,
an insert arranged radially inwards the base and configured to be at least partially inserted in the associated open cavity, and
a baseplate extending transversally from the base, the baseplate presenting a contact surface able to be in contact with the floor, and
wherein the base is configured to contact the foot to receive the load therefrom and the insert inside the open cavity does not contact the bottom of the open cavity in a way to receive load from the foot.

15. A weighing system comprising:
a weighing device configured to be placed on a floor and to measure at least the weight of a user or an object, the weighing device comprising:
a main body,
at least one foot protruding out of the main body along a foot axis, the foot being configured to be on the floor, wherein the foot includes an open cavity, and
for each foot, a carpet pad configured to be inserted partially in the associated open cavity of the foot,
wherein each carpet pad comprises:
a base extending along a main axis and configured to engage an extremity of the foot,
an insert arranged radially inwards the base and configured to be at least partially inserted in the associated open cavity, and
a baseplate extending transversally from the base, the baseplate presenting a contact surface able to be in contact with the floor, and
wherein the insert comprises at least two leaves, each leaf of the two leaves extending along the main axis and being adapted to be deformed while being inserted inside the associated open cavity.

16. The weighing system according to claim 15, wherein the insert comprises four leaves, the four leaves comprising two couples of leaves facing each other on each side of the main axis.

17. The weighing system according to claim 15, wherein each leaf presents a curved free extremity to enable a smooth insertion of the insert in the associated open cavity.

18. A carpet pad configured to be engaged in an open cavity of a foot of weighing device, the carpet pad comprising:

a base extending along a main axis, configured to engage an extremity of the foot, an insert arranged radially inwards the base and configured to be inserted in the open cavity, and a baseplate extending transversally from the base, the baseplate presenting a contact surface able to be in contact with the floor, wherein the insert comprises at least two leaves, each leaf of the two leaves extending along the main axis and being adapted to be deformed while being inserted inside the open cavity.

* * * * *